United States Patent
Wang et al.

(10) Patent No.: US 10,948,980 B2
(45) Date of Patent: Mar. 16, 2021

(54) ELECTRONIC DEVICE SYSTEM WITH CONTROLLERS

(71) Applicant: Apple Inc., Cupertino, CA (US)

(72) Inventors: Paul X. Wang, Cupertino, CA (US); Pol Pla I Conesa, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/828,664

(22) Filed: Mar. 24, 2020

(65) Prior Publication Data

US 2020/0356162 A1 Nov. 12, 2020

Related U.S. Application Data

(60) Provisional application No. 62/846,408, filed on May 10, 2019.

(51) Int. Cl.
*G06F 3/01* (2006.01)

(52) U.S. Cl.
CPC .............. *G06F 3/011* (2013.01); *G06F 3/017* (2013.01)

(58) Field of Classification Search
CPC .................................. G06F 3/011; G06F 3/017
See application file for complete search history.

(56) References Cited

U.S. PATENT DOCUMENTS

| | | | |
|---|---|---|---|
| 8,325,138 B2 | 12/2012 | Touma et al. | |
| 8,430,753 B2 | 4/2013 | Ikeda et al. | |
| 8,605,036 B1 | 12/2013 | Kelly | |
| 9,310,887 B2 | 4/2016 | Wieder | |
| 9,317,108 B2 | 4/2016 | Touma et al. | |
| 10,824,235 B2 * | 11/2020 | Keller | G06F 3/011 |
| 2011/0115719 A1 | 5/2011 | Ng | |
| 2015/0177836 A1 * | 6/2015 | Ouchi | G06F 3/0304 345/156 |
| 2016/0361638 A1 | 12/2016 | Higgins et al. | |
| 2017/0315620 A1 * | 11/2017 | Johri | G06F 3/0304 |
| 2019/0155439 A1 * | 5/2019 | Mukherjee | G06F 1/163 |
| 2019/0212822 A1 * | 7/2019 | Keller | G06F 3/011 |
| 2019/0346925 A1 * | 11/2019 | Daniels | G06F 1/1694 |
| 2020/0074962 A1 * | 3/2020 | Norieda | G06T 7/70 |
| 2020/0276497 A1 * | 9/2020 | Nietfeld | A63F 13/44 |
| 2020/0285322 A1 * | 9/2020 | Johri | G06F 3/02 |

FOREIGN PATENT DOCUMENTS

| | | | | |
|---|---|---|---|---|
| CN | 107918485 A | * | 4/2018 | ......... G06F 3/03547 |
| CN | 108027655 A | * | 5/2018 | ............. G06F 3/011 |
| CN | 108027656 A | * | 5/2018 | ......... G06K 9/00355 |
| KR | 101566113 B1 | * | 11/2015 | ......... G06F 3/03547 |

* cited by examiner

*Primary Examiner* — Michael Pervan
(74) *Attorney, Agent, or Firm* — Treyz Law Group, P.C.; G. Victor Treyz; Kendall W. Abbasi

(57) ABSTRACT

An electronic device may have a housing configured to be worn on a user's body or held in a user's hand. The electronic device may have control circuitry that wirelessly controls external equipment such as equipment with a display. By gathering motion information and other user input and wirelessly transmitting this information to the external equipment, the electronic device may serve as a wireless controller that controls content on the display. The electronic device may have multiple structures that move relative to each other such as first and second housing portions. The second housing portion may move to an extended position where the gathering of sensor information on changes in user finger position as the user interacts with real-world objects is enhanced.

19 Claims, 8 Drawing Sheets

ELECTRONIC DEVICE SYSTEM WITH CONTROLLERS

This application claims the benefit of provisional patent application No. 62/846,408, filed May 10, 2019, which is hereby incorporated by reference herein in its entirety.

FIELD

This relates generally to electronic devices, and, more particularly, to electronic device systems with controllers.

BACKGROUND

Electronic equipment such as head-mounted devices have displays. The displays may provide content to a user. In some systems, controllers are provided to allow a user to interact with visual content. A controller may, for example, detect hand movements that are used in manipulating items on a display.

If care is not taken, controllers may not be ergonomic or may not perform as expected. These shortcomings may make it difficult for a user to interact with the electronic equipment.

SUMMARY

An electronic device may have a housing configured to be worn on a user's body or held in a user's hand. The electronic device may have control circuitry. The control circuitry may include communications circuitry such as wireless communications circuitry. During operation, the electronic device may gather input from a user and may transmit the user input to electronic equipment. The electronic equipment may have input-output components such as a display. As an example, the electronic equipment may be equipment that has a display such as a head-mounted device with a display.

The electronic device may have a housing. The housing may be a handheld housing that is configured to be held in a user's hand during use or may be configured to be worn on a body part of the user. In some configurations, portions of the device may receive some of the user's fingers while leaving other fingers free to move and touch real-world objects.

During use of the electronic device, the electronic device may gather user housing motion information indicative of changes in position and orientation of the housing by the user. The device may use an accelerometer or other position sensor mounted in the housing to monitor housing motion. Input-output devices such as optical sensors and other sensors may be used to gather information on the position of the user's fingers as the user interacts with real-world objects. For example, the tips of the user's fingers may touch tabletops and other real-world surfaces. Other information such as the position of real-world objects in the user's environment may also be gathered using the sensors. The sensors may gather finger position information and other information in real time as the position sensor is detecting housing motion.

In some configurations, the electronic device may have multiple structures that move relative to each other such as first and second housing portions. Sensors may be mounted in the second portion of the housing. When it is desired to monitor finger movement, the second housing portion may be moved to an extended position. This may provide sensors with an enhanced view of the user's fingers, tabletops, and other real-world objects and may otherwise facilitate the gathering of sensor information as the user interacts with real-world objects.

DETAILED DESCRIPTION

A system may include one or more electronic devices that interact with each other. As an example, the system may have a device with a display such as a computer or head-mounted device. This device may display content for a user. The system may also have one more additional electronic devices that communicate with the equipment that has the display and/or that communicate with each other. During operation, the system may use the electronic devices to gather input from the user to control the content displayed for the user. For example, user input such as user-induced housing motion input may be gathered from a handheld controller that directs the system to move an item being displayed on the display. Haptic output, audio output, visual output, and other output may be provided to the user in synchronization with the content being supplied on the display.

In some arrangements, use of an electronic device may help ease burdens on other equipment in the system. For example, use of a handheld controller in a system may help offload computational tasks from a head-mounted device and/or may help decentralize the locations battery components. In this way, power and computational burdens may be reduced for head-mounted devices or other wearable equipment.

During operation, handheld controllers may, if desired, be used in gathering information on interactions between a user's fingers and other body parts and the system in addition to tracking movement of the handheld controller and other user interactions. For example, a handheld controller may be used to capture real-time readings on the location, orientation, and motion of handheld controller while simultaneously assisting the system in gathering user input such as information on the positions and motions of the user's fingers relative to real-world and virtual items that are visible to the user. The system may also gather information on the real-world objects in the user's environment. For example, the location of a tabletop or other object in the user's vicinity may be monitored as the user's fingertips touch the tabletop or other object.

Figure 1:
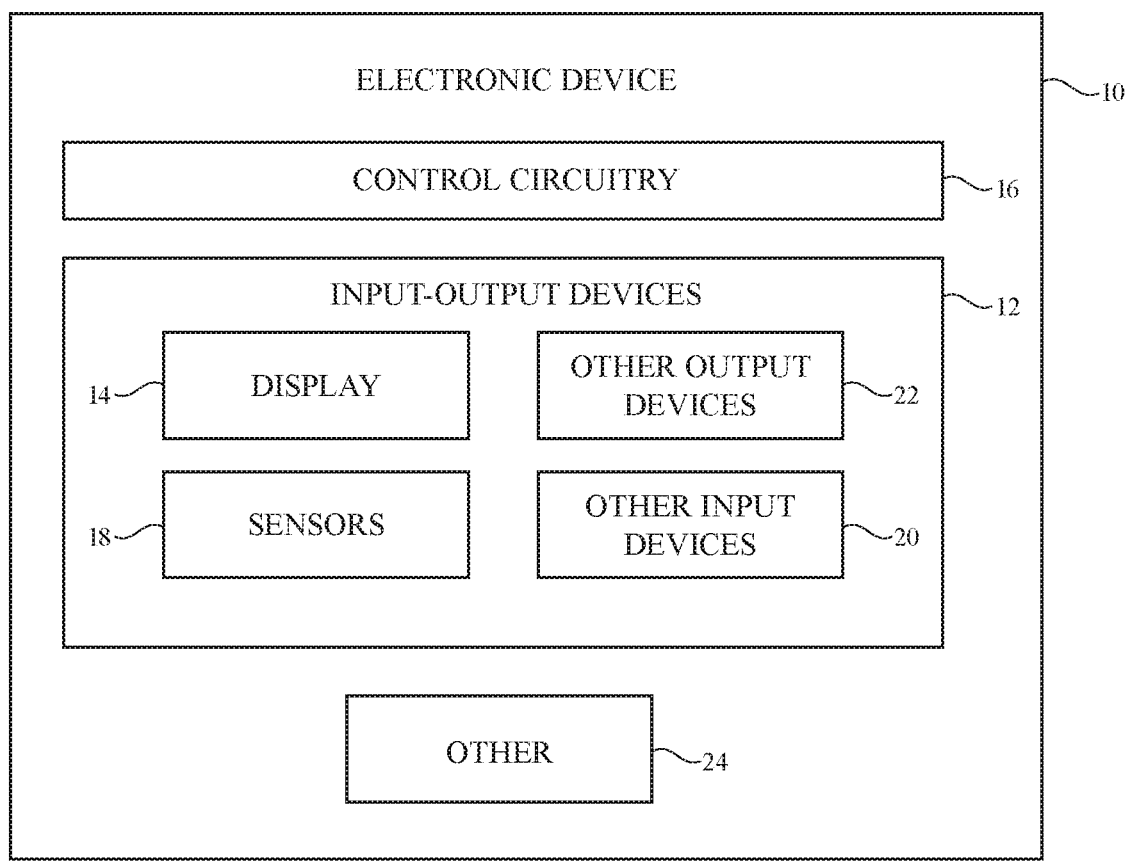
FIG. 1 is a schematic diagram of an illustrative electronic device in accordance with an embodiment.

An illustrative electronic device is shown in FIG. 1. Electronic device 10 may be a computing device such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wrist-watch device, a pendant device, a headphone or earpiece device, a device embedded in eyeglasses or other equipment worn on a user's head (e.g., a helmet, goggles, hat, or other head-mounted device), a finger-mounted device, a glove, a wristband, an armband, or other wearable or miniature device, a television, a computer display that does not contain an embedded computer, a gaming device, a navigation device, a tower computer, an item of furniture, an embedded system such as a system in which electronic equipment is mounted in a kiosk or automobile, equipment that implements the functionality of two or more of these devices, or other electronic equipment. If desired, device 10 may be a removable external case for electronic equipment, may be a band or may include a band (e.g., a wristband or headband), may be a removable cover for a device, or may be any other suitable electronic device.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include wired and/or wireless communications circuitry (e.g., antennas and associated radio-frequency transceiver circuitry such as cellular telephone communications circuitry, wireless local area network communications circuitry, etc.). The communications circuitry of control circuitry 16 may allow device 10 to communicate with other electronic devices. For example, control circuitry 16 (e.g., communications circuitry) may be used to allow wired and/or wireless control commands and other communications to be conveyed between devices such as cellular telephones, tablet computers, laptop computers, desktop computers, head-mounted devices, handheld controllers, finger devices, wristwatch devices, other wearable devices, keyboards, computer mice, remote controls, speakers, accessory displays, accessory cameras, and/or other electronic devices.

Input-output circuitry in device 10 such as input-output devices 12 may be used to allow data to be supplied to device 10 and to allow data to be provided from device 10 to external devices. Input-output devices 12 may include input devices that gather user input and other input and may include output devices that supply visual output, audible output, or other output.

Input-output devices 12 may include one or more displays such as display 14. Devices 12 may, for example, include an organic light-emitting diode display, a liquid crystal display, a projector display (e.g., a projector based on a micromechanical systems device such as a digital micromirror device or other projector components), a scanning mirror device, a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may be a touch screen display that includes a touch sensor for gathering touch input from a user or display 14 may be a touch insensitive display that is not sensitive to touch.

In addition to display 14, output may be provided using other output devices 22. These devices may include, for example, light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

Input-output devices 12 may also include sensors 18. Sensors 18 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor and/or a two-dimensional force sensor overlapping display 14, and/or a touch sensor or force sensor that forms a button, trackpad, or other input device not associated with a display), and other sensors. Touch sensors for display 14 or for other touch sensors may be based on an array of capacitive touch sensor electrodes, acoustic touch sensor structures, resistive touch components, force-based touch sensor structures, a light-based touch sensor, or other suitable touch sensor arrangements. If desired, display 14 may have a force sensor for gathering force input (e.g., a two-dimensional force sensor may be used in gathering force input on display 14).

If desired, sensors 18 may include optical sensors such as optical sensors that emit and detect light, ultrasonic sensors, optical touch sensors, optical proximity sensors, and/or other touch sensors and/or proximity sensors, monochromatic and color ambient light sensors, visible light image sensors, infrared image sensors (e.g., thermal image sensors), fingerprint sensors, temperature sensors (e.g., thermal sensors that sense contact by fingers and other user body parts by measuring temperature changes), sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

Device 10 may include other input devices 20. Devices 20 may include mechanical devices for gathering input such as buttons, joysticks, scrolling wheels, key pads, keyboards, and other devices for gathering user input. During operation, device 10 may use sensors 18 and/or other input-output devices such as devices 20 to gather user input (e.g., buttons may be used to gather button press input, touch and/or force sensors overlapping displays can be used for gathering user touch screen input and/or force input, touch pads and/or force sensor may be used in gathering touch and/or force input, microphones may be used for gathering audio input, etc.).

If desired, electronic device 10 may include additional components 24. These components may include, for example, a battery or other energy storage device, connector ports for supporting wired communications with ancillary equipment and for receiving wired power, and other circuitry. Devices 10 may serve as accessories and/or may include wired and/or wireless accessories (e.g., keyboards, computer mice, remote controls, trackpads, etc.).

The components of device 10 may be mounted in a housing. The housing may have any suitable shape. For example, the housing may be configured to be handheld (e.g., to be held in a user's hand) and/or may have other configurations. Housing structures (e.g., housing walls, internal support structures, etc.) may be formed from polymer, metal, glass, fabric, crystalline materials such as sapphire, other materials, and/or combinations of these materials. Electrical components (e.g., control circuitry, input-output devices, etc.) may be mounted in an interior portion of the housing, may include structures mounted on exterior surfaces or near exterior surfaces of a housing, may operate through housing windows and other transparent housing structures, and/or may otherwise be supported within the housing of device 10.

Figure 2:
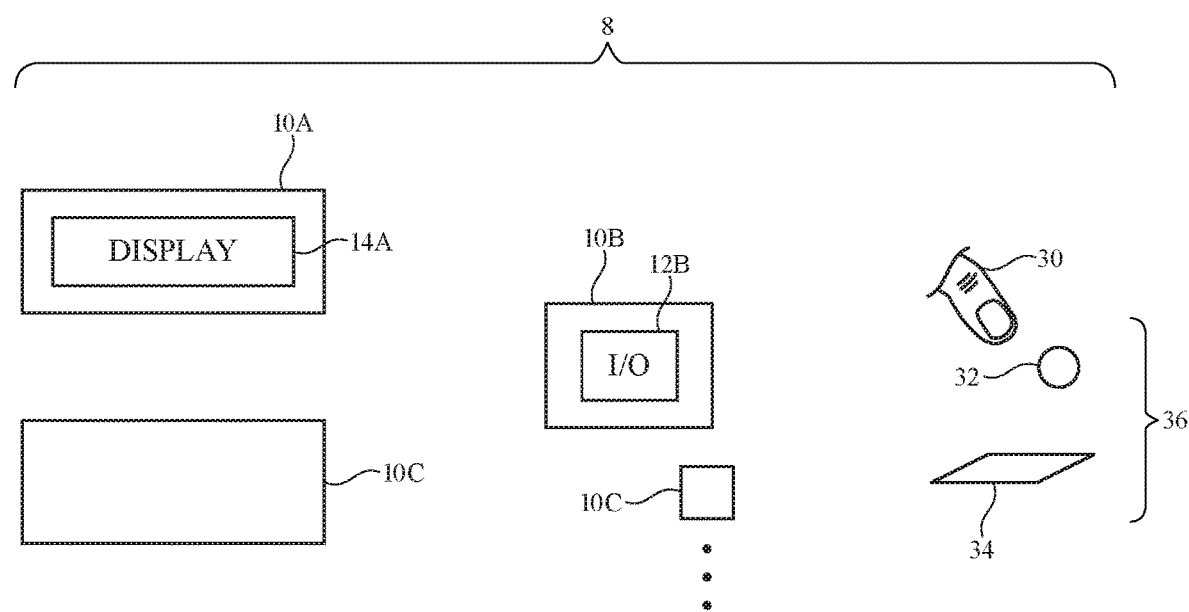
FIG. 2 is a diagram of an illustrative electronic device system in accordance with an embodiment.
Figure 8:
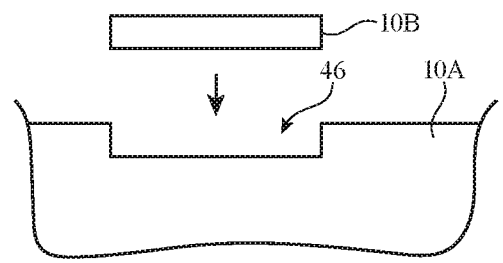
FIG. 8 is a front view of an illustrative electronic device having a portion configured to receive a handheld controller device or other equipment for storage in accordance with an embodiment.

FIG. 2 is a diagram of an illustrative system of the type that may include electronic devices 10. As shown in FIG. 8, multiple devices 10 (e.g., devices 10A, 10B, 10C, . . . ) may be used by a user in system 8. These devices may communicate with each other directly or using other devices as intermediaries. Wired and/or wireless communications paths may be used. The information contained in the wired and/or wireless communications between devices 10 may include control commands, visual data, audio data, haptic output information, and/or other information transmitted and received by the control circuitry of devices 10.

In an illustrative arrangement, at least one of the devices (e.g., device 10A) contains a display (e.g., display 14A) and at least one of the devices (e.g., device 10B) contains sensors and other input-output devices (devices 12B). With this type of arrangement, a user may use device 10B and/or other devices such as devices 10A and/or 10C to gather input that is used in controlling device 10A. The user may, for example, supply input that controls the content displayed on display 14A of device 10A. The content may be viewed alone and/or may be overlaid on real-world objects 36 (e.g., using a head-mounted device). Device 10B (and, if desired, other devices such as device 10A and devices 10C) may supply haptic feedback and other output during operation. Device 10B may be a handheld controller or a device worn on a user's wrist or other body part. During operation, device 10B and optional additional devices such as device 10C may gather input for controlling device 10A and may provide a user with output. Device 10A may use display 14A and other input-output components to provide the user with output.

As an example, a first of devices 10 such as device 10B may be a handheld controller with sensors for gathering finger position information and other environmental information. A sensor for gathering finger position information and/or information on the location of real-world objects and/or other sensors such as a housing position sensor (e.g., an inertial measurement unit) may be mounted in a handheld housing. During operation, the housing position sensor may be used to gather information on housing motions as the user moves the first device to control visual content displayed on a second of devices 10 such as device 10A. Real time control commands may be sent wirelessly or via a wired connection from first device 10B (e.g., the handheld controller) to second device 10A (e.g., to control motion of a graphical element being displayed on a display in connection with a game or other application running on the second device, etc.). The first device may also have one or more finger position sensors that monitor user finger position (and therefore finger orientation and motion) as a user touches real-world objects. The finger position sensor (and/or additional sensors) may also monitor the positions of tabletops and other real-world objects as the user touches the real-world objects. Sensor information such as finger motion information from the finger position sensor may be conveyed wirelessly or via wired connection to the second device in addition to the motion commands and may also be used to control objects being displayed on the display of the second device.

User input may be gathered from the user and output may be provided to the user during the user's interactions with the equipment of system 8 and/or during user interactions with real-life objects 36. Real-life objects 36 may include solid objects such as illustrative object 32 that have non-planar surfaces and objects such as tabletop 34 that have planar surfaces. System 8 may monitor the positions of the real-world object surfaces and may monitor when and where the user (e.g., the user's fingers such as user finger 30) contacts these surfaces. For example, input-output devices 12 such as sensors 18 may be located in a handheld device that is being used by the user as a handheld controller for another device. The sensors may monitor the position (and thereby the location and motion) of the user's fingertips on the real-world objects and can then use this information as a form of input for controlling system 8. If desired, system 8 may use information on the user's contact with objects 36 to determine when and how to provide the user with haptic feedback and other output.

Consider, as an example, a scenario in which a user is wearing device 10B on a body part. A user wearing device 10B may use device 10B to detect where and when the user's fingertips contact a real-world object and can use this information to manipulate visual content that is being overlaid on the real-world object by display 14 (e.g., a display in a head-mounted display device that merges computer-generated content with real-world images). Because device 10B may be held and/or worn close to the user's fingertips, device 10B may employ sensors for object monitoring and fingertip monitoring (sometimes referred to as fingertip monitoring sensors or finger sensors) that benefit from satisfactory visibility (e.g., a satisfactory line-of-sight) to the user's fingertips and close proximity between device 10B and the user's fingertips. These sensors may include, for example, optical sensors such as cameras with digital image sensors, time-of-flight optical sensors, three-dimensional image sensors, thermal imaging sensors (e.g., infrared image sensors operating at wavelengths associated with radiated body heat), and other optical sensors, acoustic sensors such as ultrasonic position sensing sensors, radio-frequency sensors such as radar-type radio-frequency sensors, etc. Movable housing structures may be used to help deploy the sensors in a satisfactory location for gathering finger position information and other information on user interactions with real-world objects.

In some configurations, a user may wear and/or otherwise use multiple devices while controlling device 10A. For example, device 10C may be a finger-mounted device (finger device) that captures information on the motion and other activity of the user's finger and device 10B may be a handheld device or other device in close proximity to device 10C. In this type of scenario, both device 10B and device 10C may be used in gathering user input. As an example, device 10B may gather information on the position of a user's finger (e.g., finger position relative to an external surface and/or other finger position information) and device 10C may gather information on a specific time at which the user's finger touches the surface and/or information on an amount of force with which the user's finger is pressing against the external surface.

Figure 3:
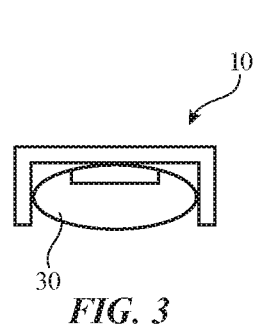
FIG. 3 is a side view of an illustrative finger device on a user's finger in accordance with an embodiment.

FIG. 3 is a side view of an illustrative electronic device for system 8. Device 10 of FIG. 3 is a finger device that has a housing configured to be worn on a user's finger (e.g., a housing that grips one or more surfaces of a user's finger). During operation, input-output devices 12 may gather information on the movement of device 10 and other activities of device 10 and can convey this information to a head-mounted device or other equipment in system 8 to control that device. Output may be provided in device 10 of FIG. 3 using haptic output components and/or other output devices.

Figure 4:
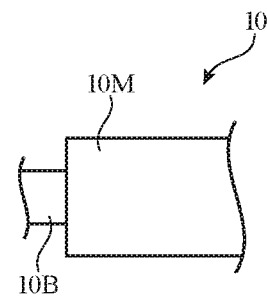
FIG. 4 is a diagram of an illustrative electronic device with a housing unit coupled to a band in accordance with an embodiment.

FIG. 4 shows how device 10 may have a housing with a main portion 10M and a band portion 10B. Band portion 10B may be a fabric band (strap) or a band formed from metal links or other structures. Band 10B may be configured to be worn on a user's wrist, arm, head, or other body part. Main portion 10M may have a soft flexible housing structure or a rigid housing structure (e.g., a housing formed form rigid metal, polymer, and/or transparent material such as glass or crystalline transparent material such as sapphire). As an example, main portion 10M may be the main unit of a wristwatch or may be the main housing of a head-mounted device.

Figure 5:
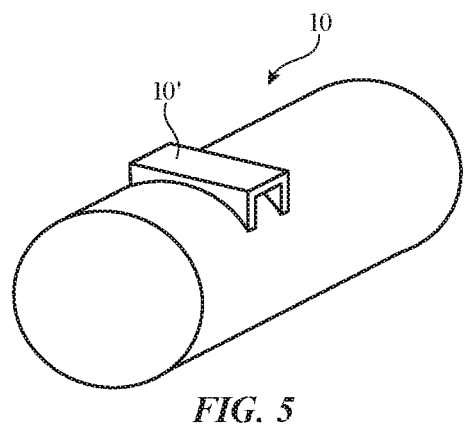
FIG. 5 is a perspective view of an illustrative cylindrical handheld controller with groves configured to receive a finger device for storage in accordance with an embodiment.

In the example of FIG. 5, device 10 is a handheld device with a cylindrical housing. The housing may have grooves or other structures configured to accommodate portions of the housing walls of removable finger device 10'. For example, the housing of device 10 may have slots into which portions of finger device 10' may be pressed and temporarily retained by friction. The shape of the curved outer surface of the housing of device 10 may be configured to be comfortably held in a user's hand (e.g., by having a portion with a radius of curvature similar to that of the user's curved fingers as the finger grips device 10). The radius of curvature of the curved housing may, for example, be 1 cm to 20 cm, at least 2 cm, at least 5 cm, less than 50 cm, or other suitable radius of curvature.

Figure 6:
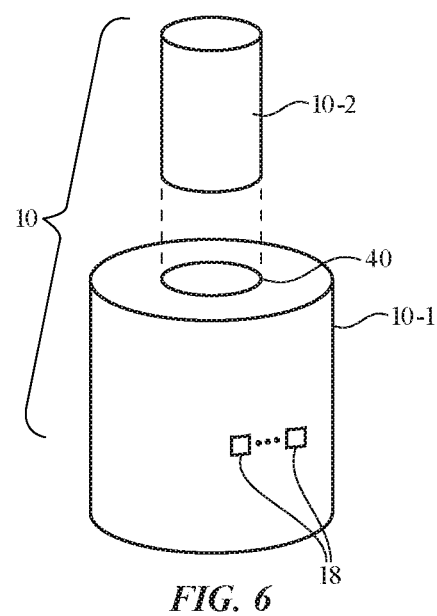
FIG. 6 is a perspective view of an illustrative handheld controller system in which a first handheld controller is stored within a cavity in a second handheld controller in accordance with an embodiment.

FIG. 6 shows an illustrative configuration for device 10 in which device 10 has two portions. Portions 10-1 and 10-2 may be, for example, handheld electronic devices with cylindrical housings or other housings adapted to be held in the fingers (hand) of a user. The housing of device 10 of FIG. 6 and the other electronic devices in system 8 may be formed from polymer, fabric, metal, glass, crystalline material such as sapphire, ceramic, wood and other natural materials, other materials, and/or combinations of these materials. In the illustrative arrangement of FIG. 6, the housing of device portion (device) 10-1 has a cavity such as cavity 40 that is configured to receive the housing of device portion (device) 10-2 for temporary storage. Other arrangements (e.g., magnets, fasteners, etc.) for removably coupling device portions 10-1 and 10-2 together may be used, if desired. During operation, device 10 may use sensors 18 to gather input from a user. Each device portions 10-1 and 10-2 may, for example, have optical sensors, radio-frequency sensors, ultrasonic sensors, capacitive touch sensor electrodes and/or other sensor structures (e.g., thermal sensors that detect finger presence by detecting finger-induced temperature rises) for gathering touch input, force input, air gestures associated with motions of the user's finger near to device 10 (e.g., within 1-10 cm, at least 0.5 cm, less than 100 cm, or other suitable distance of device 10), etc. Capacitive touch sensor electrode arrays may be formed form metal electrode structures, transparent conductive structures, and/or other electrode structures (e.g., capacitive sensor pads in a two-dimensional array over some or all of the exposed housing surface of device 10). This allows a user to supply touch input (e.g., multitouch gestures and other touch input, taps, swipes, and other finger gestures, etc.).

Figure 7:
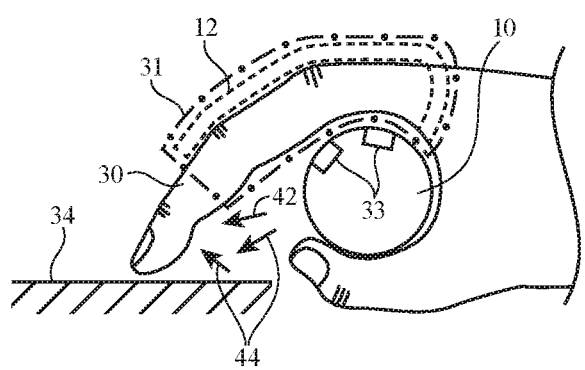
FIG. 7 is a side view of an illustrative handheld controller being used to monitor a user's finger interactions with a surface in accordance with an embodiment.

FIG. 7 shows how a device 10 may be a handheld device that is held in a user's hand as the user's fingers 30 interact with the surface of an external object (object 34). As indicated by arrows 42 and 44, sensor measurements (optical, radio-frequency, acoustic, etc.) may be performed using a direct line-of-sight path (arrow 42) or may exploit one or more reflections from surfaces such as the surface of object 34 (arrows 44). In addition to using sensors 18 to monitor the activities of the tips of fingers 30, device 10 may use sensors 18 to gather information on the locations of real-world objects and to gather user input associated with contact with the surface of device 10 (e.g., using force sensors, touch sensors, etc.) and/or to gather information on position, orientation, and movement of device 10 (e.g., using an inertial measurement unit or other position sensor). As shown by illustrative input-output devices 12, device 10 may, if desired, include a finger position sensor that is coupled to the main housing of device 10. The finger position sensor may be formed from a flexible elongated member that extends along finger 30 and rests against the upper surface of finger 30. Optional gripping members may extend downward at one or more locations along the length of the flexible elongated member to help hold onto finger 30. The flexible member (finger position sensor) may have strain gauge sensors for measuring finger deflection. Devices 12 may include sensors 18 that detect air gestures, touch input, force input, and/or other user input and may be formed at any suitable location within device 10.

If desired, device 10 may include a wearable fabric glove (with enclosed finger tips or open finger tips), finger sheath (with enclosed finger tip(s) or open finger tip(s)), wearable frame, or other wearable structure (e.g., optional wearable structure 31 of FIG. 7). A portion of wearable structure 31 may be fixedly attached to a cylindrical housing member or other housing structure associated with device 10 (e.g., a fabric glove, finger sheath(s), or other wearable structure may be coupled to a rigid handheld housing for device 10). Wearable structure 31 may be formed from fabric and/or other materials and may, if desired, be rolled up around the outside of a cylindrical housing member or other housing structure in device 10 when not being worn, may be retracted within an interior portion of a housing structure for device 10 when not being worn, or may otherwise be stowed while not in use). Wearable structure 31 may have multiple finger sheath portions for receiving respective fingers of a user or may have other suitable shapes. When a user is wearing structures 31, device 10 may be held in a position close to the user's hand or other body part as shown in the example of FIG. 7.

Structure 31 may contain input-output devices 12 (e.g., one or more devices 12 may be housed within structure 31), input-output devices 12 may be formed as an integral portion of structure 31, and/or input-output devices 12 may be coupled to an exterior surface of structure 31. In some arrangements, input-output devices 12 are mounted only in a rigid housing for device 10 and structures 31 are free of input-output structures.

Wearable structure 31 may be worn by a user while the user is using device 10 and may help a user manipulate device 10 and otherwise use device 10 while minimizing the risk of dropping device 10. If desired, wearable structure 31 may include fabric or other structures configured to be worn on a user's wrist and/or other body parts. Arrangements in which structure 31 is configured to be worn on a user's finger(s) and/or hand are illustrative.

In some embodiments, device 10 may include suction cups 33 (e.g., pneumatic suction cups that grip the user's palm). Suction cups 33 may allow device 10 to be palm mounted and may help hold device 10 in a position where device 10 is blocked from view by the user and others in the vicinity of the user.

In addition to providing device 10 with wearable structures 31, portions of the housing of device 10 may be provided with finger holes or other structures that allow device 10 to receive a user's finger or other body part. Arrangements in which portions of the housing of device 10 are configured to receive a user's finger or other body part (whether using finger openings in device 10, finger recesses, wearable structures 31, etc.), allow the user to manipulate and use device 10 without actively gripping and holding device 10. Because device 10 may, in theses arrangements, be attached to a user's hand or other body part without requiring the user to actively hold device 10, a user's hands and fingers can be freed to hold real-world objects, to gesticulate, and/or to otherwise be used normally to interact with the real world while the user is using device 10 to provide input to the system.

In the example of FIG. 8, one device (e.g., device 10A, which may be, for example, a head-mounted device or other device) has a housing recess and/or other structures configured to receive and retain another device (e.g., device 10B, which may be, for example, a handheld controller).

Figure 9:
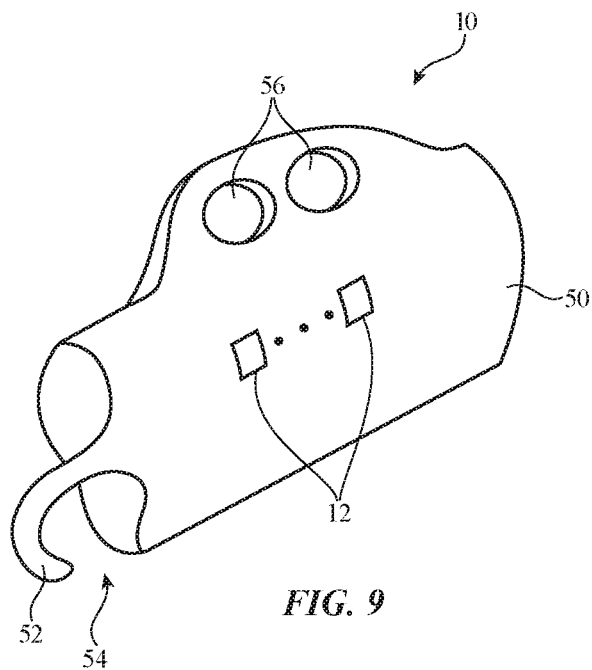
FIGS. 9 and 10 are perspective views of illustrative handheld controllers with finger openings in accordance with embodiments.

FIG. 9 is a perspective view of device 10 in an illustrative configuration in which device 10 has a housing (handheld housing 50) configured to be held in a user's hand. The housing may have a curved surface that is characterized by a radius of curvature that matches the curve of a user's natural finger shape as the user grips device 10. Portion 52 of housing 50 may be configured to form a hook or other structure defining a finger recess (finger opening 54). Finger opening 54 may, as an example, be configured to receive a user's thumb as the user grips housing 50. Housing 50 may also have openings such as finger openings 56 (e.g., to receive the user's third and fourth fingers as the user holds device 10). The user's index finger (and/or other suitable fingers) may be free in this type of arrangement so that the user's finger can interact with real-life objects (see, e.g., finger 30 of FIG. 7, which is interacting with tabletop 34). Input-output devices 12 such as sensors 18 may be located on one or more surfaces of housing 50 (e.g. on fixed and/or extendable portions of housing 50) for gathering information on the movement of the user's fingers and/or other user input. If desired, input-output devices 12 in device 10 may include a joystick and/or other mechanical input device and/or sensors 18 that are mounted on a surface of housing 50 that is adjacent to the user's thumb.

Figure 10:
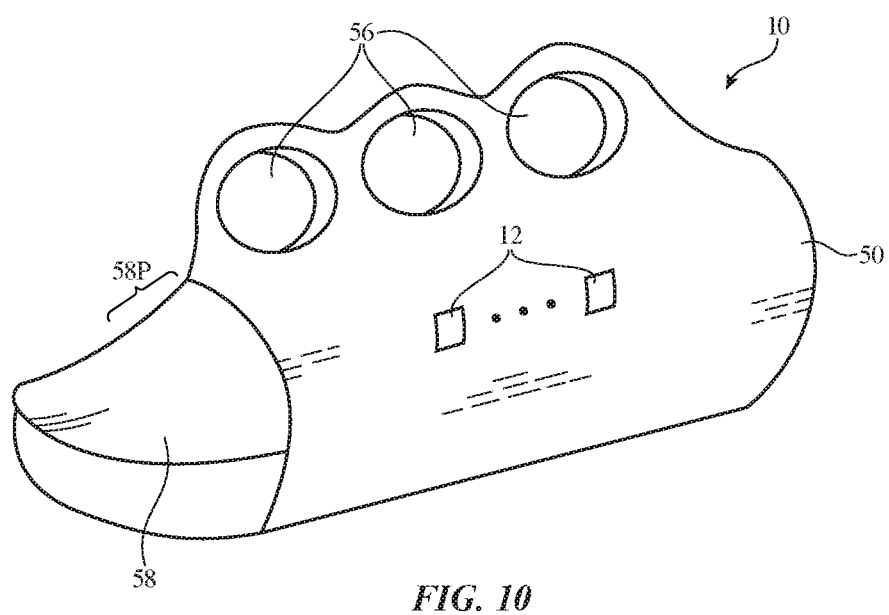

Another illustrative arrangement for device housing 50 where housing 50 is configured to be handheld is shown in FIG. 10. In the configuration of FIG. 10, there are three finger holes 56 located along the upper surface of housing 50 and a portion such as portion 58 that can contain a two-dimensional touch sensor, two dimensional force sensor, and/or other input-output devices 12 (e.g., mechanical input devices, capacitive touch sensors, and/or other sensors 18, etc.) for gathering user input. The surface of portion 58 may be curved (e.g., some or all of the surface of portion 58 may be bent about a single axis or may exhibiting compound curvature). In an illustrative configuration, a two-dimensional sensor or other sensor on portion 58 may have electrodes or other structures that are supported on the surface of portion 58. During operation, a user's index finger may pass over surface 58P of portion 58. A user's thumb, index finger, or other finger 30 may be used to provide input to the input-output devices located in portion 58 (e.g., on the surface of portion 58). If desired, finger openings such as holes 56 may be omitted and the user's fingers can be accommodated by the grooves in housing 50.

Figure 11:
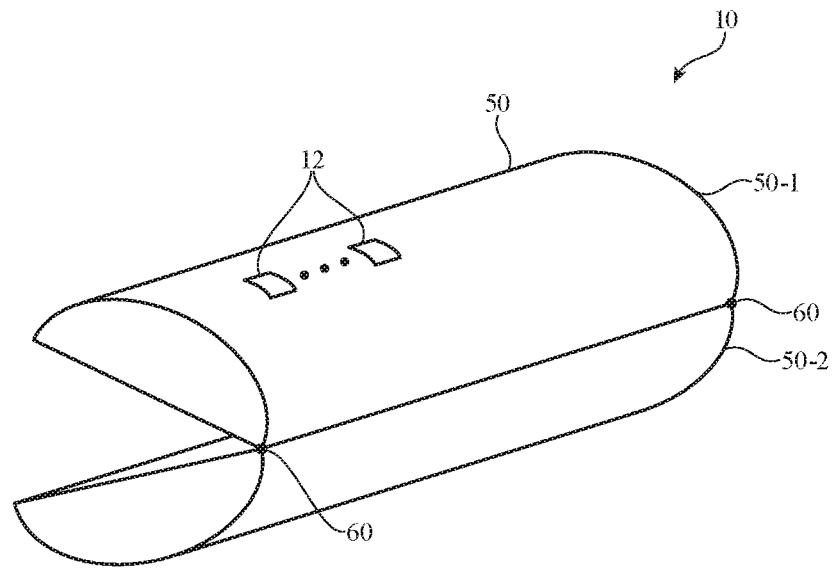
FIG. 11 is a perspective view of an illustrative expandable handheld controller in accordance with an embodiment.

FIG. 11 is a perspective view of an illustrative foldable electronic device. Device 10 of FIG. 10 has a hinge such as hinge 60. Housing 50 has first portion 50-1 and second portion 50-2 coupled for rotational motion relative to each other by hinge 60. By rotating portions of housing 50 about the hinge axis defined by hinge 60, housing 50 may be opened and closed. Input-output devices 12 (e.g., sensors 18) on device 10 can gather information on the user's fingers and other input. When housing 50 is closed, device 10 may have a compact shape that facilitates gripping by the user's fingers. When housing 50 is opened, second portion 50-2 is placed in an extended position so that device 10 has a shape that facilitates gathering user input with input-output devices 12 (e.g., sensors 18 that detect finger position) and/or device 10 may otherwise be configured to facilitate user input (e.g., device 10 may be placed in a flattened form that facilitates gathering user input from keys or other input-output devices 12 on housing 50 as device 10 rests on a table).

Figure 12:
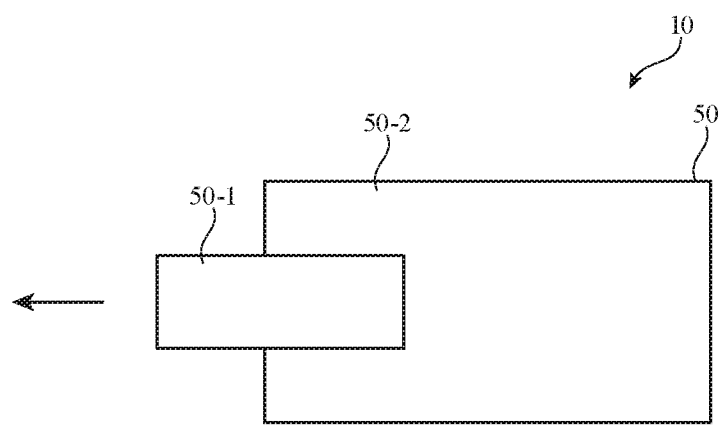
FIG. 12 is a diagram showing how an electronic device such as a handheld controller may have a housing that can be expanded by moving a housing portion into an extended position relative to another housing portion in accordance with an embodiment.

FIG. 12 is a side view of device 10 in an illustrative configuration in which first and second portions 50-1 and 50-2 are configured to allow device 10 to expand by sliding housing portion 50-1 away from housing portion 50-2, by unscrolling portion 50-1 from an interior region in portion 50-2, by unfolding portion 50-1 from portion 50-2, or by otherwise expanding device 10 to place portion 50-2 in an extended position relative to portion 50-1. Device 10 may, for example, be placed in a compact configuration when it is desired to hold housing 50 in the user's hand and may be placed in an expanded configuration when it is desired to supply button press input, touch input, force input, and/or other user input and/or to gather information on finger position using sensors 18 on portion 50-2.

Figure 13:
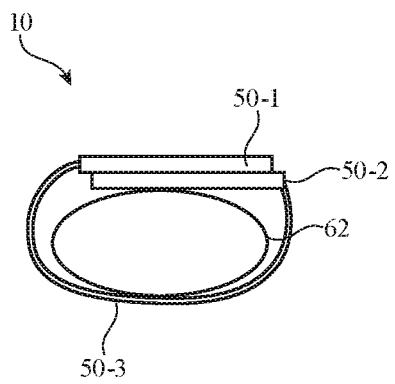
FIG. 13 is a cross-sectional side view of an illustrative device with joined housing portions and a wrist band in accordance with an embodiment.

FIG. 13 is a side view of device 10 in an illustrative configuration in which device 10 has a first rigid housing portion 50-1 and a second rigid housing portion 50-2 that are coupled by a flexible band 50-3. Portion 50-1 may, if desired, include a display and other input-output devices 12. Portions 50-1 and 50-2 may have magnets or other detachable coupling mechanisms that removably couple portions 50-1 and 50-2 together. Portions 50-1 and 50-2 may, for example, be coupled to each other when it is desired to wrap device 10 about the user's finger, wrist, or other body part 62 (e.g., so that device 10 can be worn on the user's body).

Figure 14:
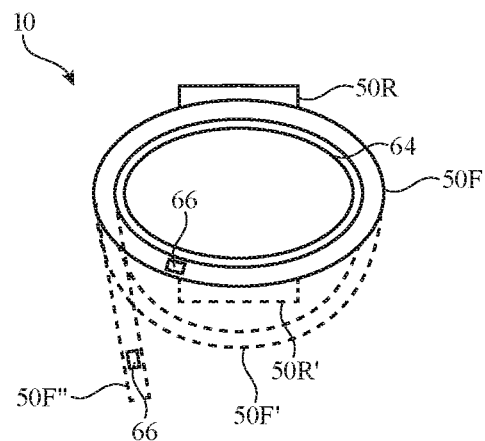
FIG. 14 is a cross-sectional side view of an illustrative device with a wrist band and other housing portions that may be used to house sensors for gathering user input in accordance with an embodiment.

In the example of FIG. 14, device 10 is a wristwatch device worn on a user's wrist or other body part (e.g., wrist 64). The wristwatch has a rigid main housing portion 50R (e.g., a housing with a display and other components) and a flexible band portion (flexible band portion 50F). Band 50 and other portions of device 10 can contain input-output devices 12 (e.g., one or more sensors for monitoring the user's finger position, etc.). These sensors and other input-output devices may be mounted in portion 50R and/or portion 50F.

To provide sensors in portion 50R with a satisfactory line of sight to the user's fingers (e.g., while the user's fingers are moving on a table top or otherwise moving to provide user input), the user may temporarily move portion 50R to the lower side of a user's wrist or other body part 62 as indicated by position 50R'. To provide sensors in portion 50F with a satisfactory light of sight to the user's fingers, the user may stretch portion 50F to extended position 50F' (where portion 50F may be held in place due to stiff bendable structures in portion 50F) or may decouple magnets 66 to allow tail end 50F'' to swing downwardly from the rest of portion 50F. By moving one portion of the band or other housing structures of device 10 into an extended position relative to other portions of the band or other housing structures of device 10, input-output devices 12 (e.g., finger position sensors and/or other sensors) may be placed into a position and orientation that facilitates the gathering of finger position information while an accelerometer (or other position sensor component (s) in an internal measurement unit) are used in monitoring user housing motion. Device 10 can wirelessly transmit information such as real-time finger position information gathered with sensor(s) 18 on the portion of the device housing in the extended position and/or other sensors(s) 18 and can wirelessly transmit housing motion data to external equipment such as a head-mounted device or other electronic equipment with a display. In this way, device 10 can be used as a wireless handheld controller that controls the operation of the external equipment (e.g., to control content being display on the display in the head-mounted device or other equipment).

Figure 15:
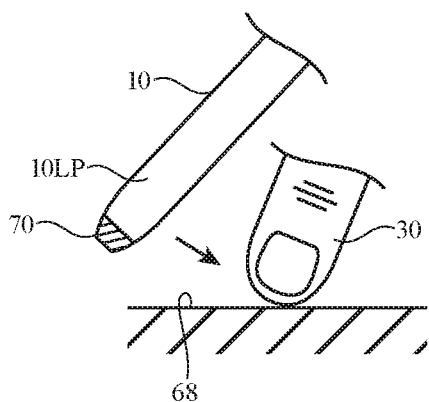
FIG. 15 is a diagram of an illustrative computer stylus being used to track the user's environment and a finger of a user as the finger interacts with a surface or other real-world object in accordance with an embodiment.

In the example of FIG. 15, device 10 is a computer stylus and surface 68 may be a surface of a touch screen in a tablet computer or other electronic device and/or may include a table top or other real-world surface not associated with an electronic device. During normal operation of device 10 as a computer stylus, the user may move computer stylus tip 70 across surface 68, thereby providing computer stylus input to system 8 (e.g., to draw a line on a display in a tablet computer in system 8, to provide stylus input to a drawing pad, etc.). Portion 10LP of device 10 may contain input-output devices 12 (e.g., sensors 18 for monitoring finger location). When held near to finger 30 (e.g., when device 10 is being held in the user's hand), input-output devices 12 may monitor movement of finger 30 (e.g., to allow a user's finger motions to modify displayed content).

Figure 16:
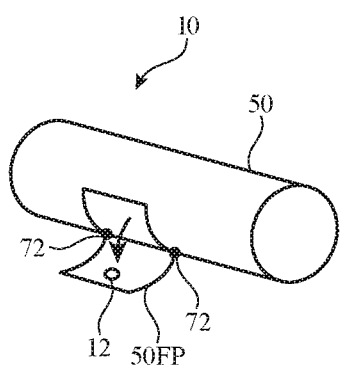
FIG. 16 is a perspective view of an illustrative handheld device with a portion that swings outwardly to an extended position relative to a main housing portion in accordance with an embodiment.

FIG. 16 shows how housing 50 of device 10 may have a movable flap. Flap 50FP may rotate outwardly about hinge 72 to an expanded position. When closed, flap 50FP may cover a cavity in housing 50 (e.g., a cavity used for storage of a finger device or other electronic device 10). If desired, flap 50FP may covers a portion of a housing wall that does not lead to a cavity. Flap 50FP may be stowed when it is desired to use device 10 as a handheld controller and may be opened when it is desired to place an input-output device 12 on flap 50P in a location with a satisfactory line of sight to the user's fingers 30 (e.g., for monitoring finger movements).

Figure 17:
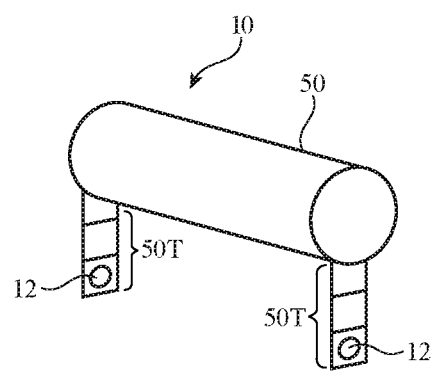
FIG. 17 is a perspective view of an illustrative handheld controller with telescoping extensions in accordance with an embodiment.

FIG. 17 is a perspective view of device 10 in an illustrative configuration in which housing 50 has telescoping portions 50T. Portions 50T may be located at opposing ends of a cylindrical housing structure or may be coupled to housing 50 at other locations. Portions 50T may have telescoping segments that can be moved to an unexpanded configuration in which portions 50T are stowed in the main body of housing 50 and/or in which size is otherwise minimized by retracting the segments into housing 50. The telescoping segments of portions 50T may also be moved to an expanded configuration in which portions 50T extend outwardly from housing 50 as shown in FIG. 17. The compact configuration may be used to reduce the size of housing 50 when the user's fingers are not being monitored by input-output devices 12. When the user's fingers are interacting with real-world objects, input-output devices 12 (e.g., sensors 18 at the tips of portions 50T) may be used to gather information on the positions and movements of the user's fingers and nearby real-world objects. By placing sensors 18 in the portion(s) of the housing of device 10 that move into an extended position, the accuracy with which line-of-sight sensor measurements and other sensor measurements are gathered with sensors 18 may be enhanced.

Figure 18:
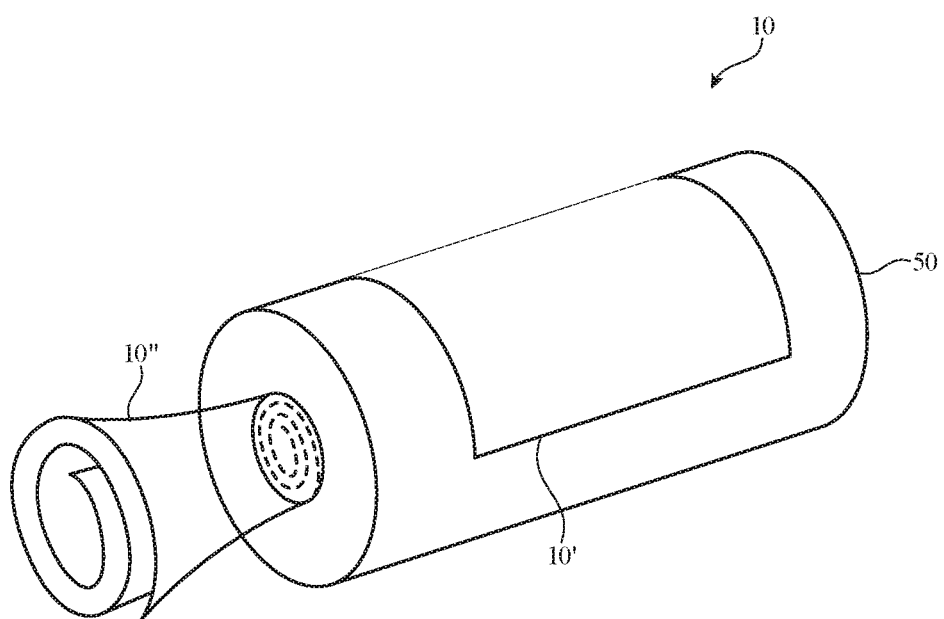
FIG. 18 is a perspective view of an illustrative handheld controller in accordance with an embodiment.

In the example of FIG. 18, housing 50 has a recess into which removable component 10' is stowed. Component 10' may be part of device 10 or may be a separate electronic device. For example, component 10' may be an electronic device such as a two-dimensional touch sensor and/or force sensor mounted in a housing such as a flexible mat housing (as an example). If desired, component 10' may be stowed in a rolled up shape within a cylindrical cavity of housing 50 (see, e.g., illustrative rolled up portion 10"). Arrangements in which component 10' is unfurled from device 10 (e.g., by unscrolling component 10') may also be used.

Figure 19:
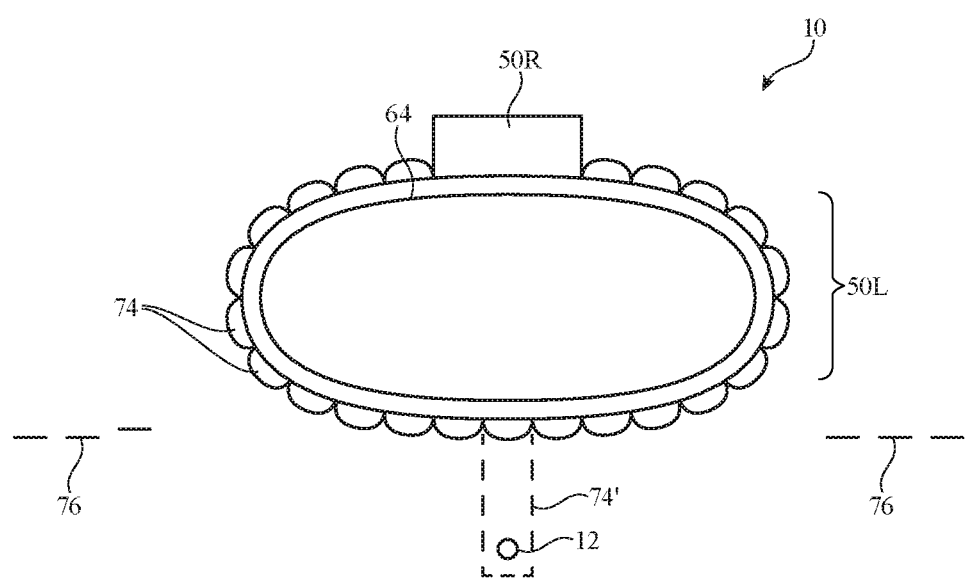
FIG. 19 is a side view of an illustrative wrist device having a wristband with an adjustable link that can be moved about a hinge into an extended position for facilitating the gathering of sensor readings from a user's fingers in accordance with an embodiment.

Device 10 may be a wristwatch device having a band with links (e.g., links formed from metal members, polymer members, etc.). As shown in FIG. 19, for example, device 10 may be worn on a user's wrist (wrist 64). The wristwatch device of FIG. 19 has a rigid main housing portion 50R (e.g., a housing with a display and other components) and a flexible band 50L with a series of interconnected links 74. Links 74 are connected for rotating movement with respect to each other (about rotational axes that extend into the page of FIG. 19) to allow band 50L to flex and conform to the contours of the user's wrist 64. When it is desired to use input-output devices 12 such as sensors 18 to gather information on the movement and position of the user's fingers (e.g., as a user is interacting with real-world objects), one of links 74 containing appropriate input-output devices 12 may be swung into a deployed position such as position 74' using a hinge aligned with hinge axis 76 (e.g., a hinge axis that is perpendicular to the rotational axes about which links 74 rotate with respect to each other in band 50L). Rotating the link into an extended position in this way may provide the sensors or other input-output devices on the deployed link with a satisfactory line of sight to the user's fingers (e.g., while the user's fingers are moving on a table top or otherwise moving to provide user input). When the sensors or other input-output devices on the deployed link are no longer being used, the link can be swung back into its stowed position in alignment with the other links of band 50L. Device 10 of FIG. 19 may be used along to gather information on finger movements and interactions with real-world objects or may serve as one of a set of multiple devices that are used in monitoring user interactions.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A handheld controller operable to gather user input from a user having a finger with a finger position and configured to use the user input to control an electronic device having a display that displays content, the handheld comprising:
    a housing configured to be handheld;
    a motion sensor configured to detect housing motion as the housing is moved;
    a sensor that measures the finger position against an external real-world object; and
    control circuitry configured to wirelessly transmit the detected housing motion and the measured finger position to the electronic device to control the displayed content.

2. The handheld controller defined in claim 1 wherein the sensor comprises an optical sensor.

3. The handheld controller defined in claim 1 wherein the sensor comprises a radio-frequency sensor configured to monitor the finger position as the finger moves through the air.

4. The handheld controller defined in claim 1 wherein the sensor comprises an acoustic sensor configured to monitor the finger position as the finger moves through the air.

5. The handheld controller defined in claim 1 wherein the housing has a first portion and has a second portion that is movable relative to the first portion and wherein the sensor is mounted to the second portion.

6. The handheld controller defined in claim 5 wherein the sensor comprises a sensor selected from the group consisting of: an optical sensor and a radio-frequency sensor.

7. The handheld controller defined in claim 1 wherein the sensor has an elongated flexible member configured to contact the finger to monitor movement of the finger.

8. The handheld controller defined in claim 1 wherein the housing has a recess configured to receive an additional electronic device that has wireless circuitry and an accelerometer.

9. The handheld controller defined in claim 1 wherein the housing has a telescoping portion and wherein the sensor is mounted on the telescoping portion.

10. The handheld controller defined in claim 1 wherein the housing has finger openings.

11. The handheld controller defined in claim 1 further comprising a two-dimensional sensor on a portion of the housing.

12. The handheld controller defined in claim 11 wherein the two-dimensional sensor comprises a two-dimensional sensor selected from the group consisting of: a two-dimensional touch sensor and a two-dimensional force sensor.

13. The handheld controller defined in claim 11 wherein the portion has a curved surface and wherein the two-dimensional sensor is formed on the curved surface and is configured to receive thumb input.

14. A wearable electronic device operable to gather user input from a user having a finger with a finger position that changes as the finger moves through the air and contacts a real-world object, wherein the wearable electronic device is configured to use the user input to control an electronic device having a display that displays content, the wearable electronic device comprising:
    a housing;
    a band coupled to the housing;
    a motion sensor in the housing that is configured to detect housing motion as the housing is moved;
    a finger sensor that is configured to measure the finger position, wherein the band has links including a hinged link that rotates away from the band and wherein the finger sensor is in the hinged link; and
    control circuitry configured to wirelessly transmit the detected housing motion and the measured finger position to the electronic equipment to control the displayed content.

15. The wearable electronic device defined in claim 14 wherein the housing comprises a rigid housing coupled to the band and wherein the wearable electronic device has a display in the rigid housing.

16. A wearable electronic device operable to gather user input from a user having a finger with a finger position that changes as the finger moves through the air and contacts a real-world object, wherein the wearable electronic device is configured to use the user input to control an electronic device having a display that displays content, the wearable electronic device comprising:
    a housing;
    a band coupled to the housing;
    a motion sensor in the housing that is configured to detect housing motion as the housing is moved;
    a finger sensor that is configured to measure the finger position, wherein the band has a tail portion and wherein the finger sensor is in the tail portion; and
    control circuitry configured to wirelessly transmit the detected housing motion and the measured finger position to the electronic equipment to control the displayed content.

17. A wireless handheld controller device operable to gather user input from a user having a finger with a finger position that changes as the finger moves through the air and contacts a real-world object, wherein the wireless handheld controller is configured to use the user input to control an electronic device having a display that displays content, the wireless handheld controller device comprising:
    a handheld housing, wherein the handheld housing has first and second portions and wherein the second portion is movable to an extended position relative to the first portion;
    a motion sensor in the handheld housing that is configured to detect housing motion as the handheld housing is moved;
    a finger position sensor in the second portion that is configured to measure the finger position while the second portion is in the extended position; and
    control circuitry configured to wirelessly transmit information on the detected housing motion and the measured finger position to the electronic device to control the displayed content.

18. The wireless handheld controller device defined in claim 17 wherein the motion sensor comprises an accelerometer and wherein the finger position sensor comprises an optical sensor.

19. The wireless handheld controller device defined in claim 18 further comprising a hinge that couples the first and second housing portions.

* * * * *